United States Patent [19]

Hashimoto

[11] Patent Number: 4,959,723
[45] Date of Patent: Sep. 25, 1990

[54] SOLID STATE IMAGE PICKUP APPARATUS HAVING MULTI-PHASE SCANNING PULSE TO READ OUT ACCUMULATED SIGNAL

[75] Inventor: Seiji Hashimoto, Yokohama, Japan

[73] Assignee: Canon Kabushiki Kaisha, Tokyo, Japan

[21] Appl. No.: 266,158

[22] Filed: Nov. 2, 1988

[30] Foreign Application Priority Data

Nov. 6, 1987 [JP] Japan .................................. 62-279390
Dec. 21, 1987 [JP] Japan .................................. 62-321423

[51] Int. Cl.⁵ .............................................. H04N 3/14
[52] U.S. Cl. ........................... 358/213.11; 358/213.26; 358/48
[58] Field of Search ....................... 358/213.26, 213.29, 358/213.22, 48, 213.15, 213.11

[56] References Cited

U.S. PATENT DOCUMENTS

| | | | |
|---|---|---|---|
| 4,300,163 | 11/1981 | Wada et al. | 358/213.15 |
| 4,314,279 | 2/1982 | Yoshida | 358/213.26 |
| 4,573,076 | 2/1986 | Tisue | 358/213.19 |
| 4,577,231 | 3/1986 | Ohba et al. | 358/213.26 |
| 4,658,287 | 4/1987 | Chen | 358/213.22 |

Primary Examiner—Stephen Brinich
Attorney, Agent, or Firm—Fitzpatrick, Cella, Harper & Scinto

[57] ABSTRACT

There is provided a solid state image pickup apparatus wherein optical information accumulated in a plurality of photoelectric converting elements are read out to the outside by multi-phase scanning pulses and the multi-phase scanning pulses scan temporary accumulation capacitors into which the optical information are accumulated and read out to the outside.

8 Claims, 16 Drawing Sheets

SOLID STATE IMAGE PICKUP APPARATUS HAVING MULTI-PHASE SCANNING PULSE TO READ OUT ACCUMULATED SIGNAL

BACKGROUND OF THE INVENTION

1. Field of the Invention

The present invention relates to a solid state image pickup apparatus and, more particularly, to a system for reading optical information accumulated in photoelectric converting elements.

2. Related Background Art

FIG. 1 is a schematic circuit diagram of a conventional solid state image pickup apparatus.

In the diagram, electrodes 100a of photoelectric converting elements 100 arranged like a matrix are commonly connected to a horizontal signal line 101 for every row. Each horizontal signal line 101 is connected to an output terminal of a vertical scanning circuit 102. Electrodes 100b of the photoelectric converting elements 100 are commonly connected to a vertical signal line 103 for every column. Each vertical signal line 103 is commonly connected to a read signal line 105 through a horizontal scanning transistor 104 having an MOS structure. A gate electrode of each scanning transistor 104 is connected to each output terminal of a horizontal scanning circuit 106. The scanning transistors 104 are sequentially turned on when a horizontal scanning pulse from each output terminal is shifted. The optical information accumulated in the photoelectric converting elements connected to a certain horizontal signal line are serially read out to the read signal line 105 by the horizontal scan. The readout optical information are amplified by an amplifier 107 and output to the outside.

A MOS transistor 108 connected to the read 105 is used to clear the signal line capacity of the read signal line 105.

In such a conventional technique, there is a fear that the level of output signal may decrease due to the capacity of the read signal line. In particular, when the number of horizontal scanning transistors increases and they are arranged at a high density, the capacity of the read signal line increases and the signal level remarkably decreases.

Therefore, there is considered a method whereby the decrease in output level is avoided by providing a buffer circuit. However, in this case, it is necessary to alternately read out the signal and noises in order to correct the noises which are generated from the buffer circuit. This causes a frequency of the scanning pulses to become high. In addition, there is also considered a case where the frequency of scanning pulses becomes high due to the realization of high resolution.

There are problems such that when the frequency of scanning pulses becomes high, a limitation on design becomes severe and the circuit arrangement also becomes complicated.

Therefore, there has also been proposed a system (JP-A-61-154366; Japanese Laid-Open Patent Gazette No. 61-154366) in which the read signal lines are divided and the vertical signal lines of the odd-number columns and the vertical signal lines of the even-number columns are connected to the divided read signal lines. With this construction, although the foregoing problems can be solved, the read signal lines are unconditionally determined for the photoelectric converting elements of the odd-number columns and for the photoelectric converting elements of the even-number columns, so that there is a fear that the application range is narrowed in the application field. For example, in the case of using the apparatus as an image pickup device in a black and white camera, it is advantageous to read out the signals of the same horizontal signal line from the same read signal line in terms of the characteristics and the installing efficiency. On the other hand, even in the case of using the apparatus as an image pickup device in a color camera, although there is a situation such that it is necessary to change the read signal lines in dependence on an arrangement of color separation filters, such a change cannot be performed in the foregoing conventional technique.

There has also been proposed a system (U.S. Pat. No. 4,658,287) in which MOS transistors are arranged at both ends of the same vertical signal line and connected to the read signal line. However, according to this invention, in order to enable one image pickup device to be used for either a black and white (B/W) camera or a color camera, an output signal line for the B/W camera is merely provided on one side of the vertical signal line and an output signal line for the color camera is merely provided on the other side.

SUMMARY OF THE INVENTION

It is an object of the present invention to provide an image pickup apparatus which can solve the foregoing problems.

According to an embodiment of the invention, this object is accomplished by a solid state image pickup apparatus in which a plurality of photoelectric converting elements are arranged like a matrix on a plurality of horizontal and vertical signal lines, wherein optical information accumulated in the photoelectric converting elements are read out to each of the vertical signal lines and selectively output from both ends of each vertical signal line.

As mentioned above, the optical information accumulated in the photoelectric converting elements are selectively output from both ends of the vertical signal line, thereby enabling the range of applications for the present invention in various ways to be enlarged.

According to another embodiment of the invention, the optical information accumulated in a plurality of photoelectric converting elements are read out to the outside by the multi-phase scanning pulses.

By alternately reading out the optical information accumulated in the photoelectric converting elements by using the multi-phase scanning pulses, the optical information can be read out by the scanning pulses at a low frequency.

The above and other objects and features of the present invention will become apparent from the following detailed description and the appended claims with reference to the accompanying drawings.

DETAILED DESCRIPTION OF THE PREFERRED EMBODIMENTS

An embodiment of the present invention will be described in detail hereinbelow with reference to the drawings.

Figure 2A:
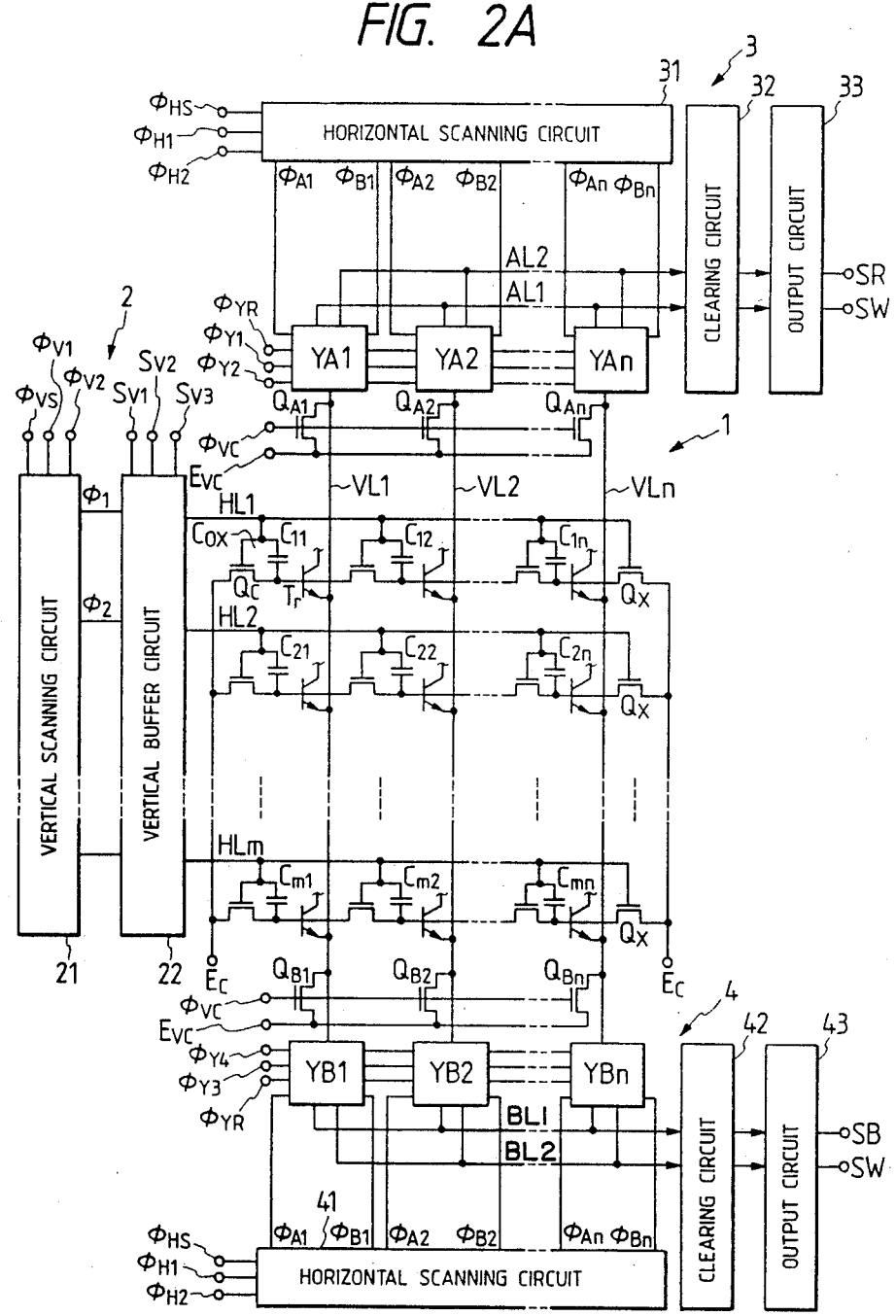
FIG. 2A is a schematic circuit diagram showing an embodiment of a solid state image pickup apparatus according to the present invention.

FIG. 2A is a schematic circuit diagram showing an embodiment of a solid state image pickup apparatus to which the invention is applied.

The solid state image pickup apparatus according to the embodiment comprises: an image pickup section 1; a vertical scanning section 2; and first and second horizontal scanning sections 3 and 4.

In the image pickup section 1, a plurality of photoelectric converting elements $C_{11}$ to $C_{mn}$ are arranged like a matrix on horizontal signal lines $HL_1$ to $HL_m$ and vertical signal lines $VL_1$ to $VL_n$. The reading operations of the photoelectric converting elements $C_{11}$ to $C_{mn}$ are executed for every row by the horizontal signal lines $HL_1$ to $HL_m$. The optical information accumulated in the elements are transferred to the first and second horizontal scanning sections 3 and 4 through the vertical signal lines $VL_1$ to $VL_n$. The readout optical information are output to the outside through read signal lines $AL_1$ and $AL_2$ of the first horizontal scanning section 3 and through read signal lines $BL_1$ and $BL_2$ of the second horizontal scanning section 4.

Since a construction of the photoelectric converting elements $C_{11}$ to $C_{mn}$ has been described in detail in JP-A-62-17150 (Title of the Invention: PHOTOELECTRIC CONVERTING APPARATUS) which had already been applied by the same applicant as the present invention, its detailed description is omitted. However, each element comprises a bipolar transistor $T_r$, a capacitor $C_{ox}$, and an MOS transistor $Q_c$. A base electrode of the transistor $T_r$ is connected to one plate of the capacitor $C_{ox}$ and to one main electrode of the transistor $Q_c$, respectively. The other plate of the capacitor $C_{ox}$ and a gate electrode of the transistor $Q_c$ are connected and they are connected to the corresponding horizontal signal lines $HL_1$ to $HL_m$ for every row. On the other hand, an emitter electrode of the transistor $T_r$ of each element is commonly connected to the corresponding vertical signal lines $VL_1$ to $VL_n$ for every column and is connected to a power source $E_{rc}$ through transistors $QA_1$ to $QA_n$ and $QB_1$ to $QB_n$, respectively.

The transistor $Q_c$ of each element is serially connected to every row. The other main electrodes of the transistors $Q_c$ connected to the vertical signal line $VL_1$ are connected to a power source $E_c$. The transistors $Q_c$ connected to the vertical signal line $VL_n$ are connected to the power source $E_c$ through MOS transistors $Q_x$ whose gate electrodes are connected to the horizontal signal lines.

Each of the MOS transistors $Q_c$ and $Q_x$ is of the p channel type and of a normally off type. These transistors are turned on when a potential of a drive signal which is applied to the gate electrode through the horizontal signal line is a negative potential which exceeds a threshold potential. On the contrary, when the potential of the drive signal is a ground potential or a positive potential, they are turned off. When those MOS transistors are turned off, the adjacent elements are electrically isolated and there is no need to form the element region. Therefore, this state is suitable to realize a fine arrangement and such a fine structure contributes to easily realize a high resolution.

Figure 2B:
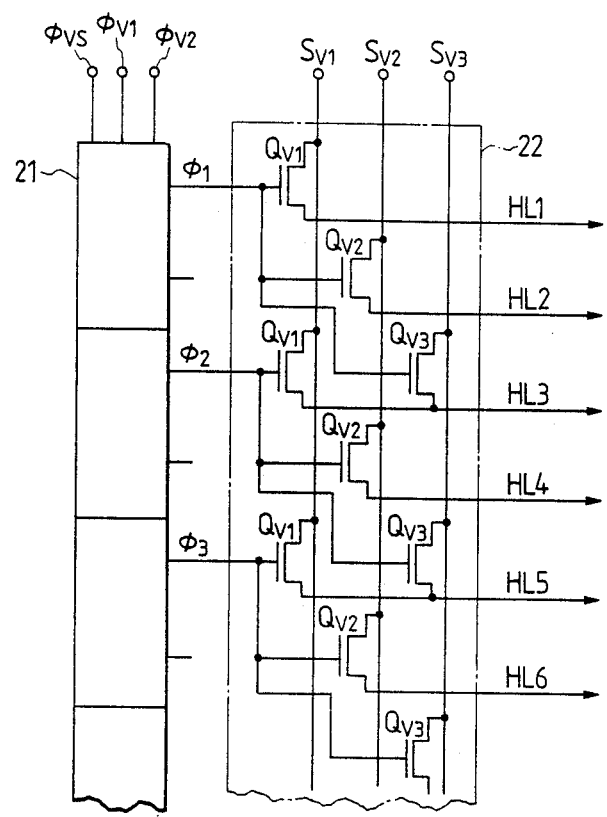
FIG. 2B is a circuit diagram showing a vertical scanning section in FIG. 2A.

The vertical scanning section 2 consists of a vertical scanning circuit 21 and a vertical buffer circuit 22. FIG. 2B is a detailed circuit diagram thereof.

In the diagram, the vertical scanning circuit 21 has a shift register construction and output terminals of respective stages thereof are connected to gate electrodes of transistors $Q_{v1}$ to $Q_{v3}$ in the vertical buffer circuit 22, respectively. Each transistor $Q_{v1}$ sequentially transfers a drive signal $SV_1$ to the horizontal signal lines $HL_1$, $HL_3$, $HL_5$, .... Each transistor $Q_{v2}$ sequentially transfers a drive signal $SV_2$ to the horizontal signal lines $HL_2$, $HL_4$, $HL_6$, .... Each transistor $Q_{v3}$ sequentially transfers a drive signal $SV_3$ to the horizontal signal lines $HL_3$, $HL_5$, $HL_7$, respectively.

Figure 3:
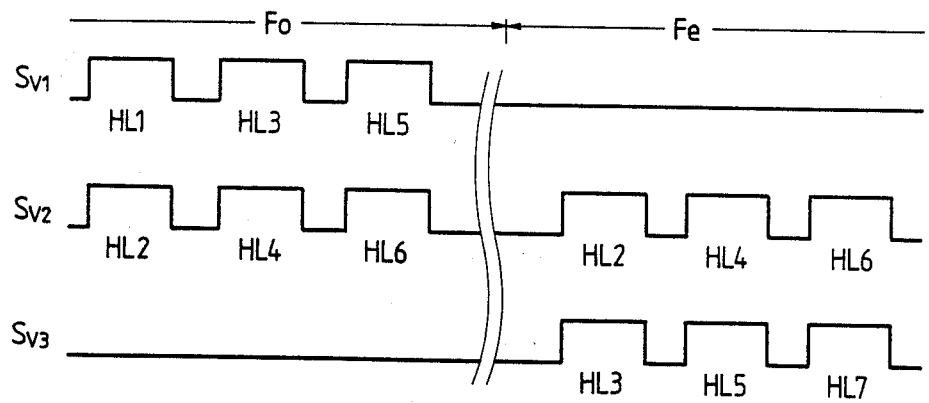
FIG. 3 is a timing chart for explaining the operation of FIG. 2B.

In such a circuit arrangement, the vertical scanning circuit 21 starts the operation by a start pulse $\phi_{VS}$ and outputs scanning pulses $\phi_1'$, $\phi_2$, ... which are sequentially set to "1" in accordance with two-phase drive pulses $\phi_{V1}$ and $\phi_{V2}$. Therefore, for example, as shown in FIG. 3, the horizontal signal lines $HL_1$ and $HL_2$, $HL_3$ and $HL_4$, ... are successively driven by applying the drive signals $SV_1$ and $SV_2$ in an odd-number field $F_o$. The horizontal signal lines $HL_2$ and $HL_3$, $HL_4$ and $HL_5$, ... are sequentially driven by applying the drive signals $SV_2$ and $SV_3$ in an even number field $F_e$. In this manner, the interlace scanning of the two-line drive is executed.

Next, the first and second horizontal scanning sections 3 and 4 are provided at both end portions of the vertical signal lines $VL_1$ to $VL_n$ and have the same structure. The signals read out on the vertical signal lines $VL_1$ to $VL_n$ are selectively output from two directions to the outside.

The first horizontal scanning section 3 comprises: a horizontal scanning circuit 31 having a shift register structure; reading circuits $YA_1$ to $YA_n$ which are respectively connected to the vertical signal lines $VL_1$ to $VL_n$; read signal lines $AL_1$ to $AL_2$; a clearing circuit 32 to clear the line capacities of the read signal lines $AL_1$ to $AL_2$; and an output circuit 33.

The second horizontal scanning section 4 similarly comprises: a horizontal scanning circuit 41 having a shift register structure; reading circuits $YB_1$ to $YB_n$; read signal lines $BL_1$ to $BL_2$; a clearing circuit 42; and an output circuit 43.

Figure 4:
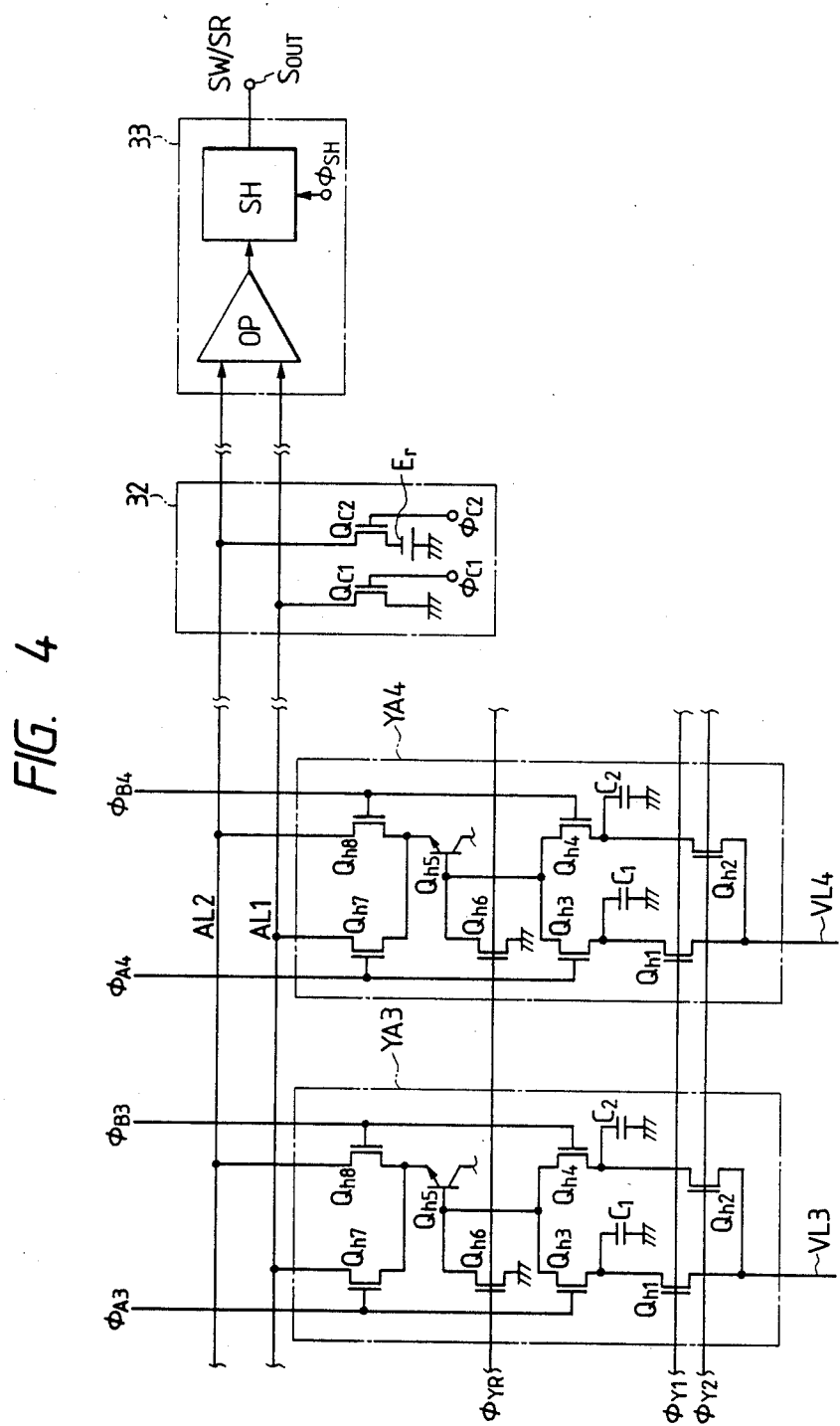
FIG. 4 is a circuit diagram showing a part of a horizontal scanning section in FIG. 2A.

FIG. 4 is a circuit diagram showing a part of the horizontal scanning section 3 and shows the reading circuits $YA_3$ and $YA_4$, clearing circuit 32, and output circuit 33.

In this diagram, the vertical signal lines $VL_3$ and $VL_4$ are respectively connected to temporary accumulating capacitors $C_1$ and $C_2$ through transferring transistors $Qh_1$ and $Qh_2$ of the reading circuits $YA_3$ and $YA_4$. The capacitors $C_1$ and $C_2$ are commonly connected to a base electrode of a buffer amplifier $Qh_5$ having a bipolar transistor structure through first scanning transistors $Qh_3$ and $Qh_4$, respectively. The buffer amplifier $Qh_5$ is provided to prevent a decrease in signal level when the signal accumulated in the temporary accumulation capacitors $C_1$ and $C_2$ are read out and to enable high speed scanning to be performed.

A base electrode of the buffer amplifier $Qh_5$ is grounded through a clearing transistor $Qh_6$ and an emitter electrode of the buffer amplifier $Qh_5$ is connected to the read signal lines $AL_1$ and $Al_2$ through second scanning transistors $Qh_7$ and $Qh_8$, respectively.

The read signal lines $AL_1$ and $Al_2$ are respectively connected to transistors $Q_{c1}$ and $Q_{c2}$ of the clearing circuit 32 to clear the line capacities. The signal line $AL_1$ is connected to the ground potential through the transistor $Q_{c1}$. The signal line $AL_2$ is connected to a power source $E_r$ through the transistor $Q_{c2}$.

Further, the signal lines $AL_1$ and $AL_2$ are connected to the output circuit 33 and connected to a differential amplifier OP having an operational amplifier structure. An output terminal of the differential amplifier OP is connected to a sample and hold circuit SH to sample and hold an input signal in response to a sampling pulse $\phi_{SH}$.

Figure 5:
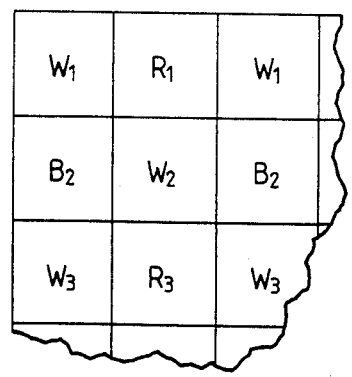
FIG. 5 is an arrangement diagram of color separation filters.

FIG. 5 is an arrangement diagram of color separation filters which are arranged over the photoelectric converting elements $C_{11}$ to $C_{mn}$ in the image pickup section 1. W denotes a white light transmitting filter, B is a blue light transmitting filter, and R is a red light transmitting filter. The filters W and R are alternately arranged over the photoelectric converting elements of the odd-number rows in accordance with this order. The filters B and W are alternately arranged over the photoelectric converting elements of the even-number rows in accordance with this order.

The operation of the solid state image pickup apparatus with such a structure will now be described with reference to timing charts of FIGS. 6 and 7.

Figure 6:
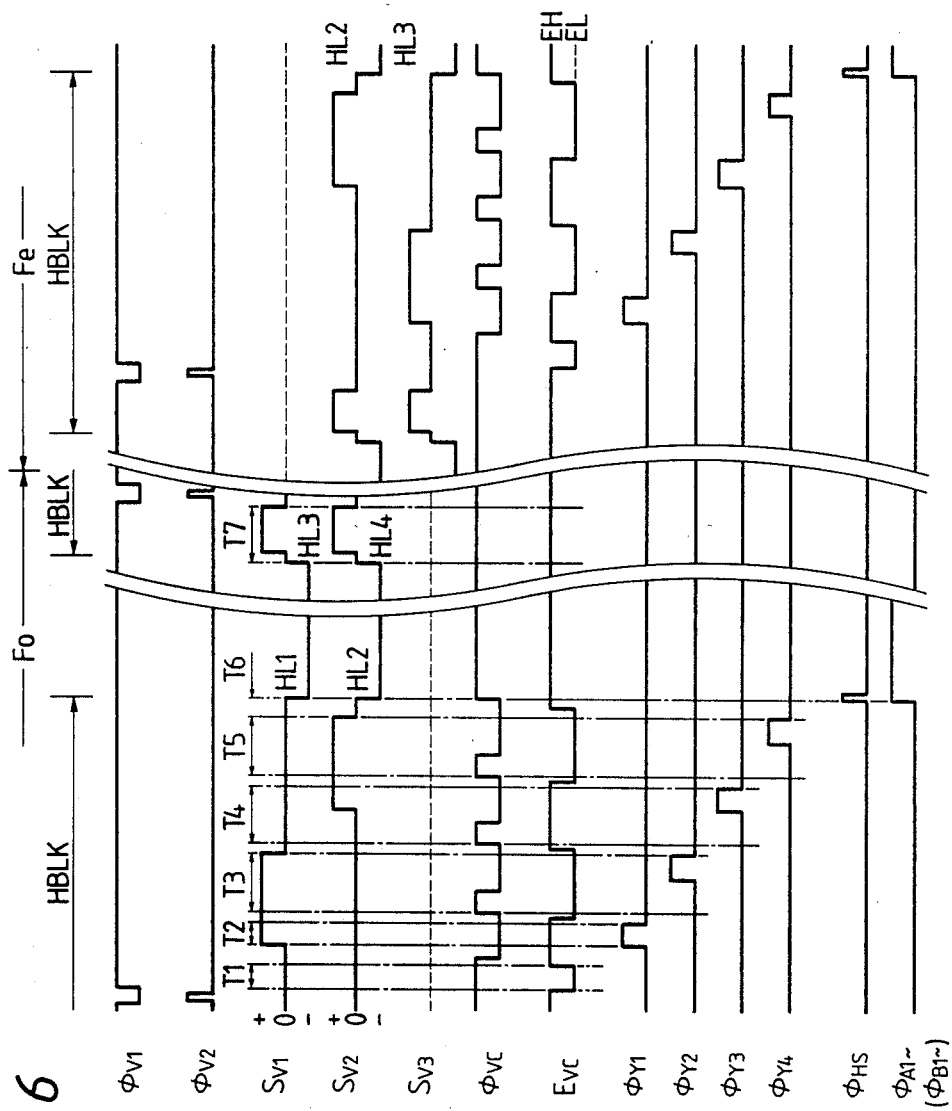
FIGS. 6 and 7 are timing charts for explaining the operations in FIGS. 2A and 4.

FIG. 6 is a timing chart showing the operation to read out the optical information accumulated in the photoelectric converting elements using the horizontal scanning section for a horizontal blanking period HBLK.

First, when drive pulses $\phi_{v1}$ and $\phi_{v2}$ are input to the vertical scanning circuit 21 in the odd-number field $F_o$, the scanning pulse $\phi_1$ rises, so that the vertical buffer circuit 22 outputs the drive signals $SV_1$ and $SV_2$ to the horizontal signal lines $HL_1$ and $HL_2$, respectively.

Simultaneously with the rising of the pulse $\phi_{v1}$, the potential of the power source $E_{vc}$ decreases from a positive potential $E_H$ to a negative potential $E_L$. At this time, since the pulse $\phi_{vc}$ is set to "1", the transistors $QA_1$ to $QA_n$ and $QB_1$ to $QB_n$ are respectively turned on. The potentials of the vertical signal lines $VL_1$ to $VL_n$, that is, the emitter potentials of the photoelectric converting elements $C_{11}$ to $C_{mn}$ decrease to $E_L$. Therefore, the elements to which the strong light is irradiated are set to the forward bias state, providing blooming suppression just before the signal reading operation is executed, so that the surplus charges are eliminated (period $T_1$).

Subsequently, the potential of the power source $E_{vc}$ is reset to $E_H$, the pulse $\phi_{VC}$ is set to "0", the transistors $QA_1$ to $QA_n$ and $QB_1$ to $QB_n$ are turned off, and the vertical signal lines $VL_1$ to $VL_n$ are set to the floating state. Thereafter, the signal components are read out. That is, the drive signal $SV_1$ is set to a positive potential, the reading operations of the elements $C_{11}$ to $C_{1n}$ of the horizontal signal line $HL_1$ are executed, and thereby reading out the accumulated optical information to the vertical signal lines $VL_1$ to $VL_n$. At the same time, a pulse $\phi_{Y1}$ is set to "1", the transferring transistors $Qh_1$ of the reading circuits $YA_1$ to $YA_n$ in the horizontal scanning section 3 are turned on, and the readout optical information is accumulated into each of the temporary accumulation capacitors $C_1$. At this time, as will be obvious from the arrangement of the color separation filters of FIG. 5, the white signal components are accumulated into the temporary accumulation capacitors $C_1$ of the reading circuits $YA_1$, $YA_3$, $YA_5$, ... of the odd-number columns and the red signal components are accumulated into the temporary accumulation capacitors $C_1$ of the reading circuits $YA_2$, $YA_4$, $YA_6$, ... of the even-number columns (period $T_2$).

Next, the power source $E_{vc}$ is again reduced to the potential $E_L$ while the drive signal $SV_1$ is held to a positive potential. The pulse $\phi_{VC}$ is set to "1" to turn on the transistors $QA_1$ to $QA_n$ and $QB_1$ to $QB_n$. Thus, the elements $C_{11}$ to $C_{1n}$ are transiently refreshed and the signal components of the optical information are eliminated. Next, the pulse $\phi_{VC}$ is set to "0" to again turn off the transistors $QA_1$ to $QA_n$ and $QB_1$ to $QB_n$. Thus, the remaining components in the elements $C_{11}$ to $C_{1n}$ are read out as the noise components to the vertical signal lines $VL_1$ to $VL_n$. At this time, when a pulse $\phi_{Y2}$ is set to "1" and the transferring transistors $Qh_2$ of the reading circuits $YA_1$ to $YA_n$ are turned on, the noise components are accumulated into each of the temporary accumulation capacitors $C_2$ (period $T_3$).

The reason why the potential of the vertical signal line, i.e., the emitter potential of the element is set to a negative potential at the time of the transient refresh is to improve the approximation with the noise components included in the signal components which were previously read out by eliminating the residual components included in the noise components by perfectly setting the element into the forward bias state.

After completion of the reading operations of the photoelectric converting elements $C_{11}$ to $C_{1n}$ of the first row, the reading operations of the photoelectric converting elements $C_{21}$ to $C_{2n}$ of the second row are executed.

First, the power source $E_{vc}$ is returned to the potential $E_H$, the pulse $\phi_{VC}$ is set to "1", and the transistors $QA_1$ to $QA_n$ and $QB_1$ to $QB_n$ are turned on, thereby fixing the signal line capacities of the vertical signal lines $HL_1$ to $HL_n$ to the potential $E_H$. Next, the pulse $\phi_{VC}$ is set to "0", the transistors $QA_1$ to $QA_n$ and $QB_1$ to $QB_n$ are turned off, and the drive signal $SV_2$ is set to a positive potential by setting the vertical signal lines $VL_1$ to $VL_n$ into the floating state. The reading operations of the elements $C_{21}$ to $C_{2n}$ connected to the horizontal signal line $HL_2$ are performed, thereby reading out the optical information to the vertical signal lines $VL_1$ to $VL_n$. At the same time, a pulse $\phi_{Y3}$ is set to "1", the transferring transistors $Qh_1$ of the reading circuits $YB_1$ to $YB_n$ of the second horizontal scanning section 4 are turned on, and the readout optical information are accumulated into the temporary accumulation capacitors $C_1$. In the arrangement of the color separation filters for the horizontal signal line $HL_2$, the B filters are arranged on the odd-number columns and the W filters are arranged on the even-number columns as shown in FIG. 5. Therefore, the blue signal components are accumulated into the temporary accumulation capacitors $C_1$ of the reading circuits $YB_1$, $YB_3$, $YB_5$, ... and the white signal components are accumulated into the temporary accumulation capacitors $C_2$ of the reading circuits $YB_2$, $YB_4$, $YB_6$, ... (period $T_4$).

Subsequently, in a manner similar to the case of the period $T_3$, the elements $C_{21}$ to $C_{2n}$ are transiently refreshed to eliminate the signal components of the optical information. Next, a pulse $\phi_{Y4}$ is set to "1" and the transistors $Q_{h2}$ of the reading circuits $YB_1$ to $YB_n$ are turned on, thereby accumulating the residual components, i.e., noise components of the elements $C_{21}$ to $C_{2n}$ into the temporary accumulation capacitors $C_2$ (period $T_5$).

In this manner, both of the signal components of the white and red information of the elements $C_{11}$ to $C_{1n}$ of the first row and the noise components thereof are accumulated into the first horizontal scanning section 3. Both of the signal components of the blue and white information of the elements $C_{21}$ to $C_{2n}$ of the second row and the noise components thereof are accumulated into the second horizontal scanning section 4.

The above operations are executed in the horizontal blanking period HBLK. Subsequently, the optical information of the first and second rows which were accumulated in the horizontal scanning sections 3 and 4 are scanned and output to the outside in the horizontal effective period. In parallel with this, the power source $E_{vc}$ is set to the potential $E_H$, the pulse $\phi_{VC}$ is set to "1", the transistors $QA_1$ to $QA_n$ and $QB_1$ to $QB_n$ are turned on, and the vertical signal lines $VL_1$ to $VL_n$ are set to the potential $E_H$. On the other hand, the drive signals $SV_1$ and $SV_2$ are set to a negative potential and the elements of the first and second rows are refreshed. That is, the MOS transistor $Q_c$ of each element is turned on and the base potential of each transistor $T_r$ is reset to a predetermined value $E_c$ (period $T_6$).

Subsequently, the drive signals $SV_1$ and $SV_2$ are set to a positive potential and the base region which was reset to a predetermined potential is refreshed. Namely, since the emitter potential of each element is fixed to the predetermined potential $E_H$ through the vertical signal line, when a positive voltage higher than the voltage $E_H$ is applied to the capacitor $C_{ox}$, the circuit between the base and emitter is set to the forward bias state and the carriers accumulated in the base region are extinguished similarly to the reading operation (period $T_7$).

After completion of the refreshing operation, the elements of the first and second rows restart the accumulating operations.

In a manner similar to the above, the reading and refreshing operations of the elements of the third and fourth rows, the fifth and sixth rows, ... in the odd-number fields $F_o$ are sequentially executed by the pulses $\phi_{V1}$ and $\phi_{V2}$ and the scanning of the odd-number fields $F_o$ is finished.

In the even-number fields $F_e$, the reading and refreshing operations of the elements of the second and third rows, the fourth and fifth rows, ... are similarly successively executed by the drive signals $SV_2$ and $SV_3$.

Figure 7:
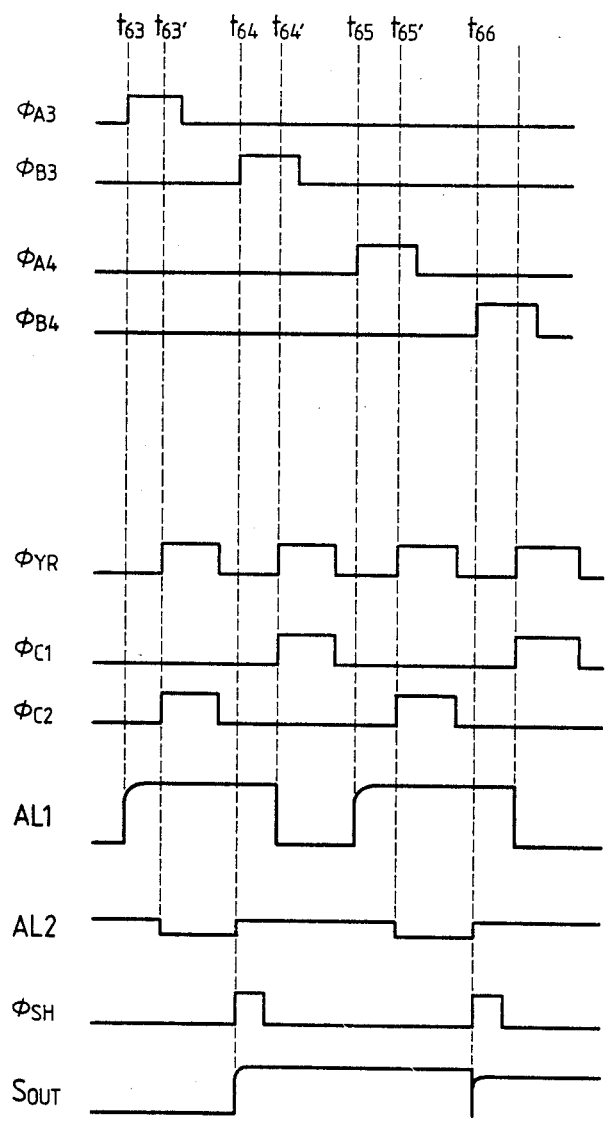

FIG. 7 is a timing chart showing the operation to read out the optical information accumulated in the horizontal scanning section to the outside in the horizontal effective period. The operation of FIG. 4 is shown in this timing chart as a typical example.

First, the reading operation is started by supplying a start pulse $\phi_{HS}$ to the horizontal scanning circuit 31. The horizontal scanning circuit 31 is driven by drive pulses $\phi_{H1}$ and $\phi_{H2}$ and output two-phase scanning pulses $\phi_{A1}$ and $\phi_{B1}$, $\phi_{A2}$ and $\phi_{B2}$, ... which are sequentially set to "1" from an output terminal. The scanning pulse $\phi_{A3}$ is output at time $t_{63}$, scanning transistors $Q_{h3}$ and $Q_{h7}$ of the reading circuit $YA_3$ are turned on, and the signal components accumulated in the temporary accumulation capacitors $C_1$ are read out to the read signal line $AL_1$ through the buffer amplifier $Q_{h5}$.

Next, a transistor $Q_{h6}$ is turned on by a pulse $\phi_{YR}$ at time $t_{63}'$. The residual charges in the temporary accumulation capacitor $C_1$ and on the base region of the buffer amplifier $Q_{h5}$ are cleared through the transistors $Q_{h3}$ and $Q_{h6}$. At this time, since the buffer amplifier $Q_{h5}$ is reversely biased and is made nonconductive, the signals which have previously been accumulated in the signal line $AL_1$ are held unchanged. On the other hand, in the clearing circuit 32, a transistor $Q_{c2}$ is turned on by a pulse $\phi_{C2}$ and the signal line $AL_2$ is cleared to the power source $E_r$.

The reason why the signal line $AL_2$ is cleared to the power source $E_r$ is because the reference potentials upon reading in the signal reading periods $T_2$ and $T_4$ and noise reading periods $T_3$ and $T_5$ differ. That is, in the signal reading periods $T_2$ and $T_4$, the initial potential before the signal reading operation is set to $E_H$. On the other hand, the initial potential before the noise reading operation in the noise reading periods $T_3$ and $T_5$ is set to $E_L$. Thus, the DC potentials of the signal components and noise components which are read to the temporary accumulation capacitors $C_1$ and $C_2$ differ. These potentials are unconditionally determined by the initial potentials of the line capacity of the vertical signal line and of the temporary accumulation capacitors of the temporary accumulation capacitors $C_1$ and $C_2$. In this embodiment, the DC potential of the noise components which are read out to the temporary accumulation capacitor $C_2$ is lower than the DC potential of the signal components which are read to the temporary accumulation capacitor $C_1$. Therefore, when the signal components and noise components are transferred from the temporary accumulation capacitors $C_1$ and $C_2$ to the read signal lines $AL_1$ and $AL_2$, the clearing potential of the signal line $AL_2$ is set to a predetermined reference potential $E_r$ (negative potential in this embodiment) lower than that of the signal line $AL_1$ in order to equalize the potential between the base and emitter of the buffer amplifier $Q_{h5}$ in the signal components reading operation with that in the noise components reading operation.

At time $t_{64}$, the transistors $Q_{h4}$ and $Q_{h8}$ of the reading circuit $YA_3$ are turned on by a scanning pulse $\phi_{B3}$. The noise components accumulated in the temporary accumulation capacitor $C_2$ are read out to the signal line $AL_2$ through the buffer amplifier $Q_{h5}$. Therefore, both of the signal components and noise components accumulated in the temporary accumulation capacitors $C_1$ and $C_2$ of the reading circuit $YM_3$ are supplied to an input terminal of the differential amplifier OP of the output circuit 33. Therefore, the differential signal which is obtained by eliminating the noise components from the signal components is held to the sample and hold circuit SH by the sampling pulse $\phi_{SH}$ and output as a white signal SW from an output terminal $S_{out}$.

The transistor $Qh_6$ is turned on at time $t_{64}'$ by a pulse $\phi_{YR}$ and the temporary accumulation capacitor $C_1$ and buffer amplifier $Qh_5$ are cleared in a manner similar to the case of time $t_{63}'$. On the other hand, in the clearing circuit 32, the transistor $Q_{C1}$ is turned on by the pulse $\phi_{C1}$ and the signal line $AL_1$ is cleared to the ground potential.

At time $t_{65}$, a scanning pulse $\phi_{A4}$ is generated and the signal components accumulated in the temporary accumulation capacitor $C_1$ of the reading circuit $YM_4$ are read out to the signal line $AL_1$.

Next, the transistor $Qh_6$ is again turned on by the pulse $\phi_{YR}$ at time $t_{65}'$ and the capacitor $C_1$ and buffer amplifier $Qh_5$ are cleared. On the other hand, in the clearing circuit 32, the transistor $Q_{C2}$ is turned on by the pulse $\phi_{C2}$ and the signal line $AL_2$ is cleared to the power source $E_r$.

At time $t_{66}$, the noise components accumulated in the temporary accumulation capacitor $C_2$ of the reading circuit $YA_4$ are read out to the signal line $AL_2$ through the buffer amplifier $Qh_5$ by a scanning pulse $\phi_{B4}$. Both of the readout noise components and the signal components which have previously been read out to the signal line $AL_1$ are supplied to the differential amplifier OP. The differential signal is held to the sample and hold circuit SH by the sampling pulse $\phi_{SH}$ and output as a red signal SR from the output terminal $S_{out}$.

In this manner, the signals of the temporary accumulation capacitors $C_1$ and $C_2$ of the reading circuits $YM_3$, $YM_4$, . . . are sequentially read out by the two-phase scanning pulses $\phi_{A3}$ and $\phi_{B3}$, $\phi_{A4}$ and $\phi_{B4}$, . . . from the horizontal scanning circuit 31 and are output as the white signal SW and red signal SR from the output terminal $S_{out}$.

On the other hand, in a manner similar to the case of the first horizontal scanning section 3, the signals accumulated in the capacitors $C_1$ and $C_2$ of the reading circuits $YB_1$ to $YB_n$ are successively read out by the two-phase scanning pulses from the horizontal scanning circuit 41 and are output as the blue signal SB and white signal SW from the second horizontal scanning section 4.

Next, another embodiment of a reading circuit will now be described with reference to FIGS. 8 to 15. In these circuit diagrams, the same parts and components as those in FIG. 4 are designated by the same reference numerals.

Figure 8:
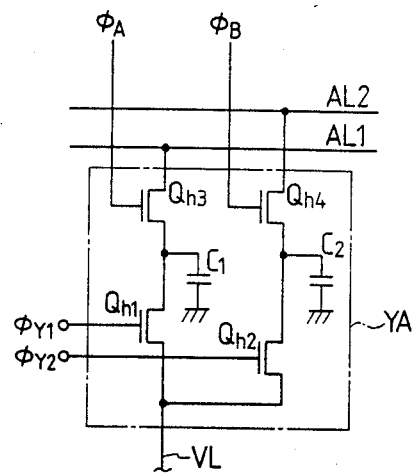
FIGS. 8 to 15 are circuit diagrams showing other embodiments of a reading circuit.

First, the reading circuit shown in FIG. 8 is constructed in a manner such that the buffer amplifier in the reading circuit of FIG. 4 is eliminated and the signals accumulated in the temporary accumulation capacitors $C_1$ and $C_2$ are directly read out to the read signal lines $AL_1$ and $AL_2$ through the transistors $Qh_3$ and $Qh_4$ which are driven by two-phase scanning pulses $\phi_A$ and $\phi_B$.

Figure 9:
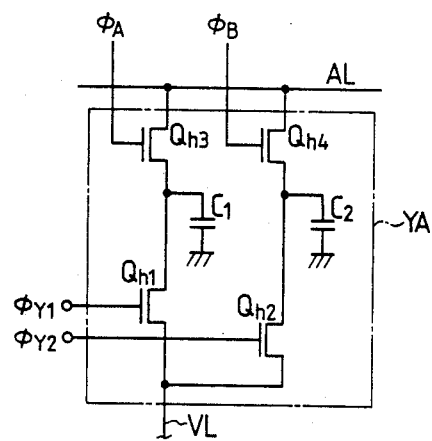
Figure 10:
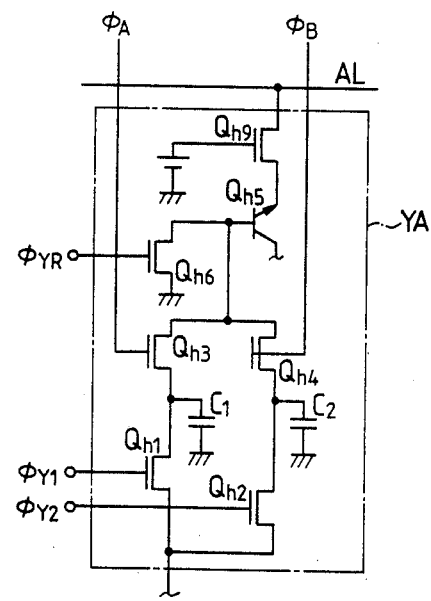

In the reading circuits of FIGS. 9 and 10, the signals accumulated in the temporary accumulation capacitors $C_1$ and $C_2$ are time sharingly read out to one read signal line AL. Therefore, in this embodiment, the output circuit has two sample and hold circuits, the signals accumulated in the temporary accumulation capacitor $C_1$ are held in the first sample and hold circuit, the signals accumulated in the temporary accumulation capacitor $C_2$ are held in the second sample and hold circuit, and thereafter, the difference between those signals is obtained by an operational amplifier. On the other hand, a load due to an MOS transistor $Qh_9$ connected to an output terminal of the buffer amplifier $Qh_5$ in FIG. 10 is provided to prevent an increase in fixed pattern noises due to the feedback by limiting the current of the buffer amplifier $Qh_5$. The means for limiting the current is not limited to the MOS transistor $Qh_9$ in this embodiment but other means for limiting a current can also be used.

Figure 1:
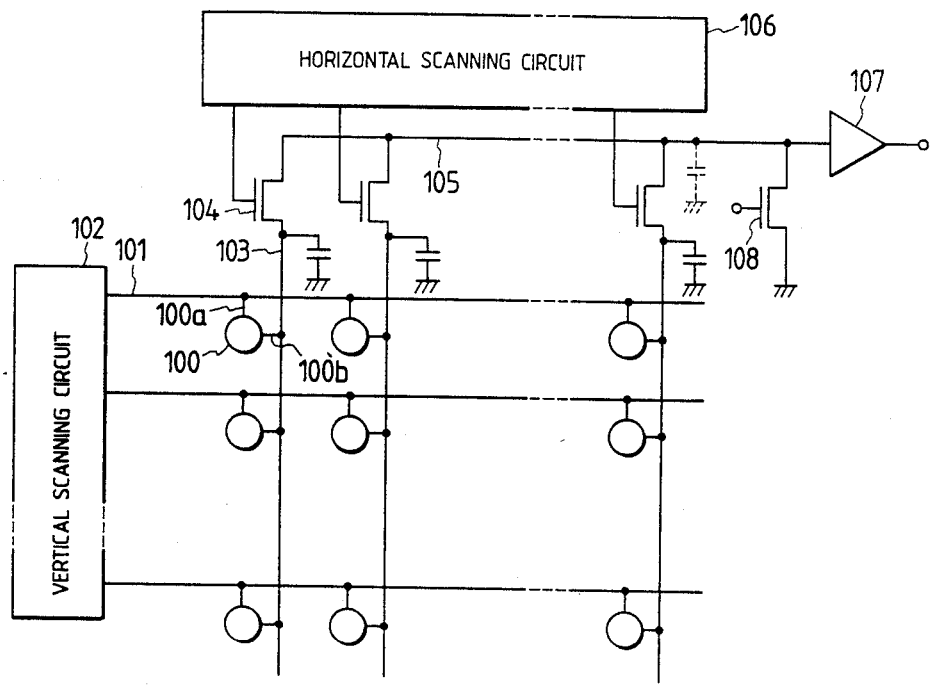
FIG. 1 is a schematic circuit diagram showing an example of a conventional solid state image pickup apparatus.
Figure 11:
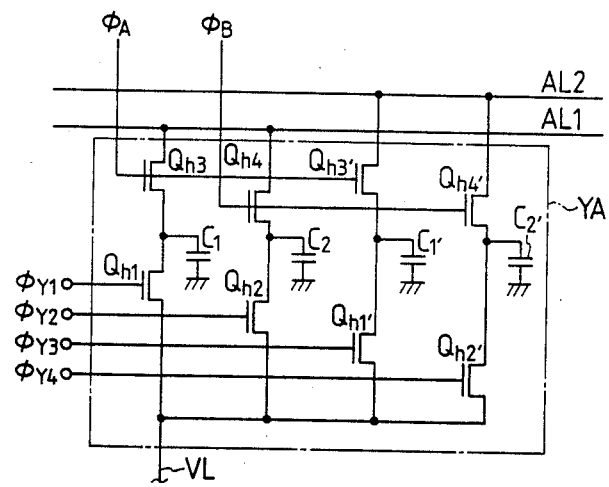
Figure 12:
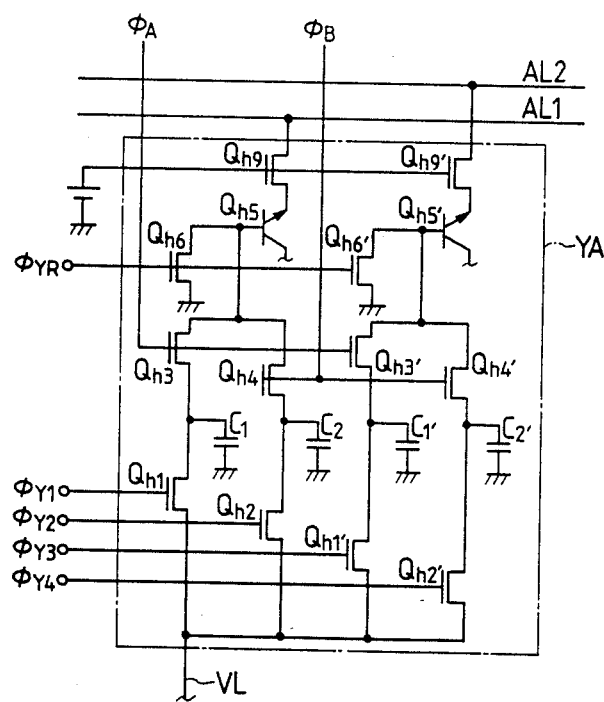

In the reading circuits shown in FIGS. 11 and 12, the number of temporary accumulation capacitors is increased as compared with those in the embodiments of FIGS. 9 and 10. Therefore, for instance, when the capacitors $C_1$ and $C_1'$ are used for the signal components and the capacitors $C_2$ and $C_2'$ are used for the noise components, the reading operations of the photoelectric converting elements connected to two horizontal signal lines can be executed. Therefore, in this case, the second scanning section shown in FIG. 1 becomes unnecessary.

Figure 13:
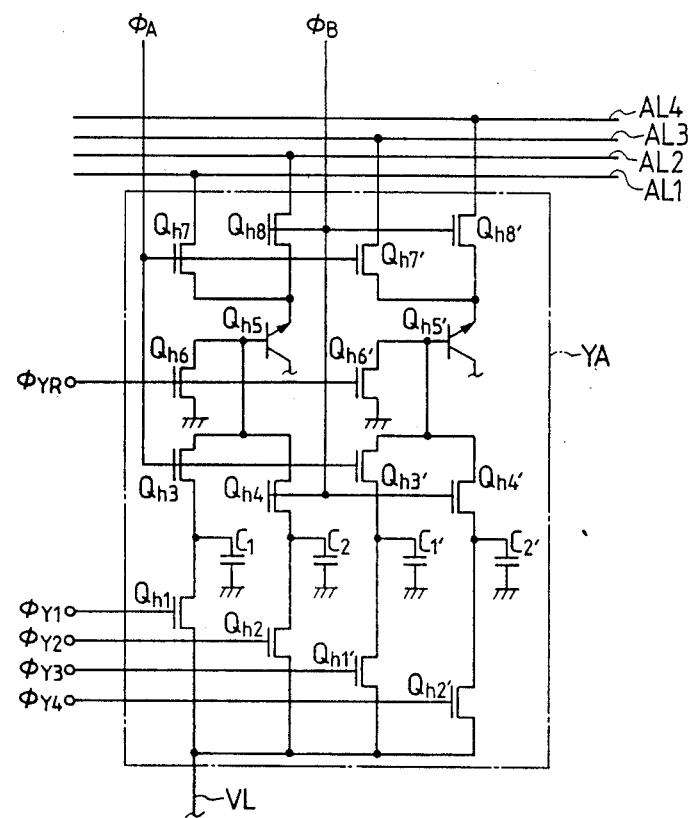

In the reading circuit shown in FIG. 13, the number of read signal lines is increased for the reading circuits in FIGS. 11 and 12 and all of the signals or noises on each of the temporary accumulation capacitors are independently read out.

Figure 14:
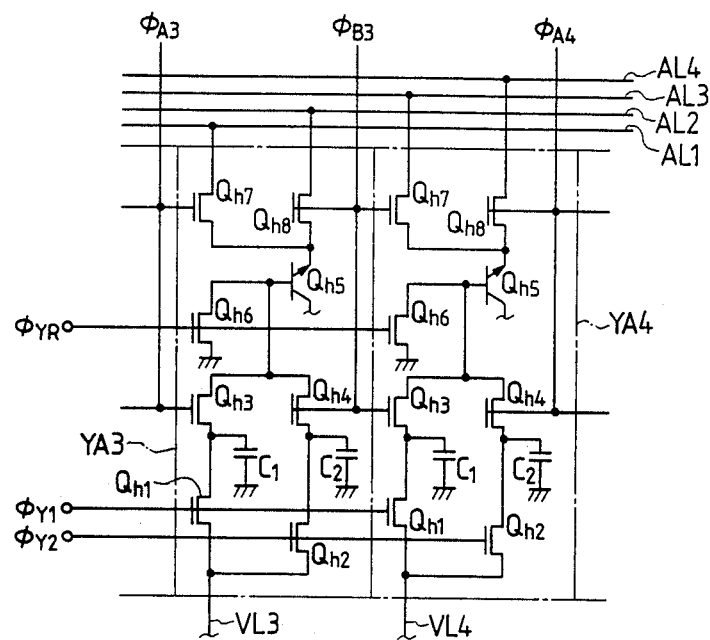

Next, different from the foregoing embodiments, an embodiment of FIG. 14 is constructed such that the reading operations of the adjacent reading circuits are alternately performed by the two-phase scanning pulses. As will be obvious from this diagram, the temporary accumulation capacitor $C_1$ of a reading circuit $YA_3$ is read out by a scanning pulse $\phi_{A3}$. The temporary accumulation capacitor $C_2$ of the reading circuit $YA_3$ and the temporary accumulation capacitor $C_1$ of a reading circuit $YA_4$ are simultaneously read out by a subsequent scanning pulse $\phi_{B3}$. Further, the capacitor $C_2$ of a reading circuit $YA_4$ and the capacitor $C_1$ of a reading circuit $YA_5$ (not shown) are simultaneously read out by a scanning pulse $\phi_{A4}$. In a manner similar to the above, the temporary accumulation capacitors $C_1$ and $C_2$ of each reading circuit are alternately read out by the two-phase scanning pulses $\phi_A$ and $\phi_B$.

Therefore, according to the embodiment, the transistors $Qh_4$ and $Qh_3$ and transistors $Qh_8$ and $Qh_7$ of the adjacent reading circuits can be connected at close positions, so that a pattern can be easily designed when realizing an LSI.

Figure 15:
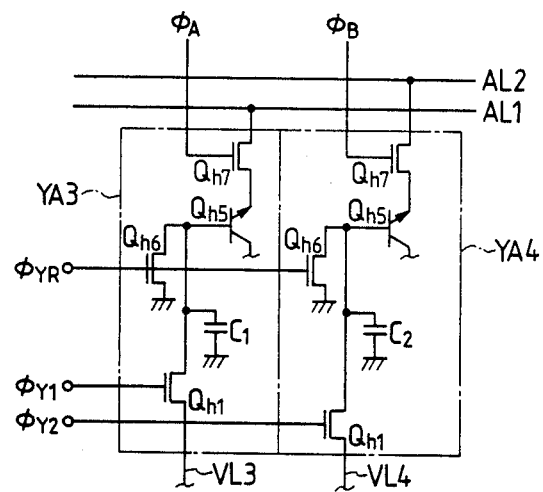

The embodiment of FIG. 15 is constructed such that the adjacent reading circuits are alternately read out by the two-phase scanning pulses in a manner similar to the embodiment of FIG. 14. According to this embodiment, the temporary accumulation capacitor $C_2$ is omitted and only the signal components are read out. Therefore, the scanning transistor at the input stage of the buffer amplifier is omitted.

As described in detail above, according to the solid state image pickup apparatus of each embodiment of the invention, the optical information which were read out to the reading circuit are read out by the multi-phase (two-phase in the embodiments) horizontal scanning pulses, so that the scanning operation can be performed by scanning pulses of a low frequency. Therefore, the frequency of the scanning pulses can be set to a high frequency and the output signal having a high picture quality can be obtained without making the circuit arrangement, pattern design, and the like complicated.

Figure 16:
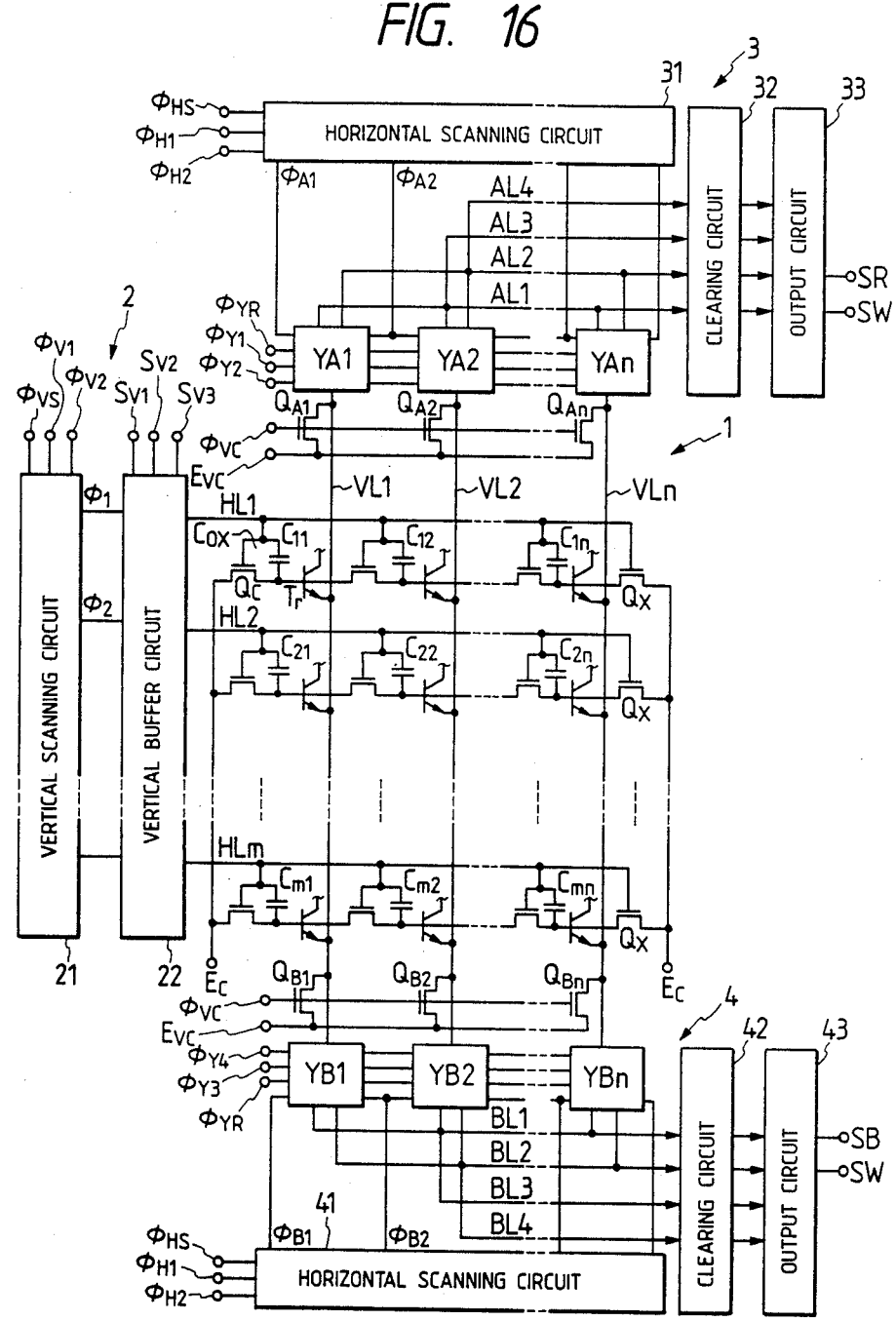
FIG. 16 is a schematic circuit diagram showing a second embodiment of a solid state image pickup apparatus according to the invention.

FIG. 16 is a diagram showing a second embodiment of the invention. The second embodiment differs from the embodiment of FIG. 2A in that the read out optical information is output outside through the read signal lines $AL_1$-$AL_4$ of the first horizontal scanning section 3 and the read signal lines $BL_1$-$BL_4$ of the second horizontal scanning section 4.

The first horizontal scanning section 3 comprises: the horizontal scanning circuit 31 having a shift register structure; reading circuits $YA_1$ to $YA_n$ which are connected to the signal lines $VL_1$ to $VL_n$; read signal lines $AL_1$ to $AL_4$; clearing circuit 32 to clear the line capacities of the signal lines $AL_1$ to $AL_4$; and output circuit 33.

On the other hand, the second horizontal scanning section 4 similarly comprises: the horizontal scanning circuit 41 having a shift register structure; reading circuits $YB_1$ to $YB_n$; read signal lines $BL_1$ to $BL_4$; clearing circuit 42; and output circuit 43.

Figure 17:
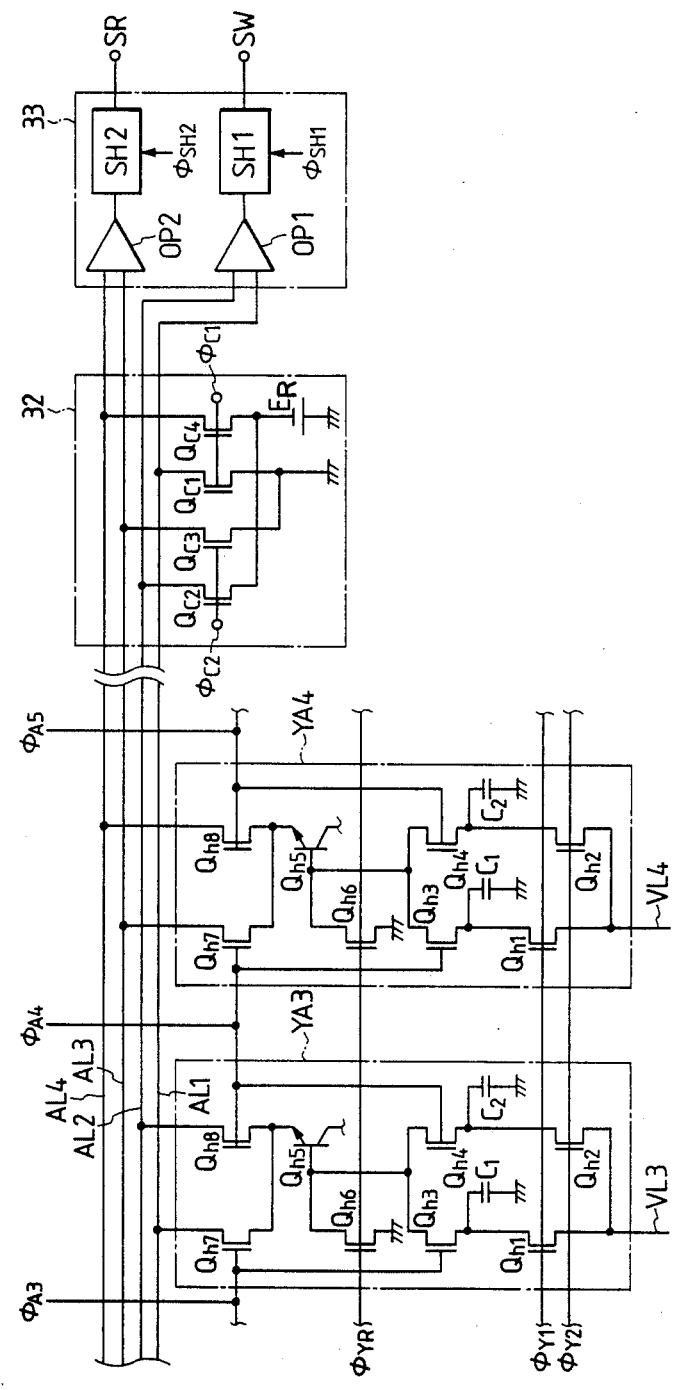
FIG. 17 is a circuit diagram showing a part of a horizontal scanning section in FIG. 16.

FIG. 17 is a circuit diagram showing a part of the horizontal scanning section and typically shows the reading circuits $YA_3$ and $YA_4$ of the first horizontal scanning section 3, clearing circuit 32, and output circuit 33.

In the diagram, the vertical signal lines $VL_3$ and $VL_4$ are respectively connected to the accumulation capacitors $C_1$ and $C_2$ through the transferring transistors $Qh_1$ and $Qh_2$ of the reading circuits $YA_3$ and $YA_4$. The capacitors $C_1$ and $C_2$ are connected to the base electrode of the buffer amplifier $Qh_5$ through the first scanning transistors $Qh_3$ and $Qh_4$, respectively. The buffer amplifier $Qh_5$ is provided to prevent a decrease in signal level when the signals accumulated in the capacitors $C_1$ and $C_2$ are read out and to enable the scanning operation to be performed at a high speed.

The base electrode of the buffer amplifier $Qh_5$ is connected to the ground through the clearing transistor $Qh_6$ and the emitter electrode is connected to a predetermined two of the read signal lines $AL_1$ to $AL_4$ through the second scanning transistors $Qh_7$ and $Qh_8$, respectively. In this case, the transistors $Qh_7$ and $Qh_8$ of the reading circuits $YA_3$ of the odd-number columns are respectively connected to the signal lines $AL_1$ and $AL_2$. The transistors $Qh_7$ and $Qh_8$ of the reading circuits $YA_4$ of the even-number columns are respectively connected to the signal lines $AL_3$ and $AL_4$.

The read signal lines $AL_1$ to $AL_4$ are respectively connected to the transistors $Q_{C1}$ to $Q_{C4}$ of the clearing circuit 32 to clear the line capacities. The signal lines $AL_1$ and $AL_3$ are connected to the ground through the transistors $Q_{C1}$ and $Q_{C3}$. The signal lines $AL_2$ and $AL_4$ are connected to the power source $E_r$ through the transistors $Q_{C2}$ and $Q_{C4}$, respectively.

On the other hand, the signal lines $AL_1$ to $AL_4$ are connected to the output circuit 33. The signal lines $AL_1$ and $AL_2$ are connected to a differential amplifier $OP_1$. The signal lines $AL_3$ and $AL_4$ are connected to a differential amplifier $OP_2$. Output terminals of the differential amplifiers $OP_1$ and $OP_2$ are connected to sample and hold circuits $SH_1$ and $SH_2$ to sample and hold the input signals by sampling pulses $\phi_{SH1}$ and $\phi_{SH2}$, respectively.

Figure 18:
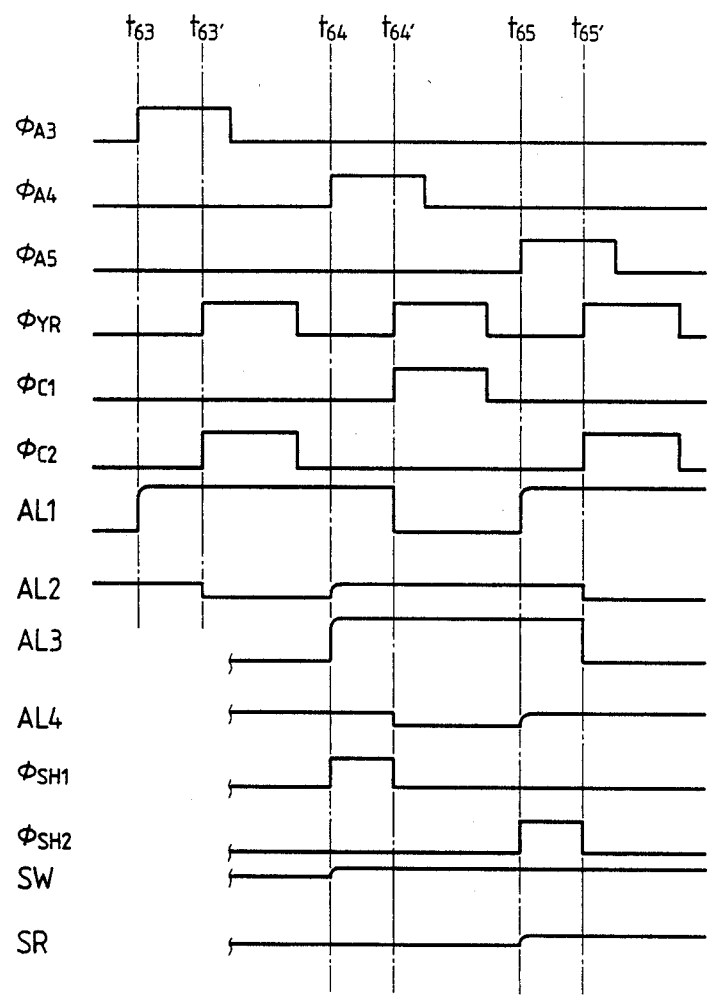
FIG. 18 is a timing chart for explaining the operations of FIGS. 16 and 17.

FIG. 18 is a timing chart showing the operation to read out the optical information accumulated in the first and second horizontal scanning sections 3 and 4 to the outside for a horizontal effective period (period $T_6$) and typically shows the operation of FIG. 17.

First, the reading operation is started by supplying the start pulse $\phi_{HS}$ to the horizontal scanning circuit 31. The horizontal scanning circuit 31 is driven by two-phase drive pulses $\phi_{H1}$ and $\phi_{H2}$ and output scanning pulses $\phi_{A1}, \phi_{A2}, \ldots$ which are sequentially set to "1" from the output terminal.

At time $t_{63}$, the scanning pulse $\phi_{A3}$ is output and the scanning transistors $Qh_3$ and $Qh_7$ of the reading circuit $YA_3$ are turned on, thereby reading out the signal components accumulated in the capacitor $C_1$ to the read signal line $AL_1$ through the buffer amplifier $Qh_5$.

Next, at time $t_{63}'$, the transistor $Qh_6$ is turned on by the pulse $\phi_{YR}$ and the residual charges in the capacitor $C_1$ and on the base region of the buffer amplifier $Qh_5$ are cleared through the transistors $Qh_3$ and $Qh_6$. At this time, since the buffer amplifier $Qh_5$ is reversely biased and is made nonconductive, the signals which have previously been read out to the signal line $AL_1$ are held unchanged.

In the clearing circuit 32, the transistors $Q_{C2}$ and $Q_{C3}$ are turned on by the pulse $\phi_{C2}$ and the signal lines $AL_2$ and $Al_3$ are cleared to the power source $E_r$ and ground, respectively.

The reason why the signal lines $AL_2$ and $AL_4$ are cleared to the power source $E_r$ is because the reference potentials in the reading operations for the signal reading periods $T_2$ and $T_4$ and for the noise reading periods $T_3$ and $T_5$ differ. That is, in the signal reading periods $T_2$ and $T_4$, the initial potential before the signal reading operation is set to $E_H$. On the other hand, in the noise reading periods $T_3$ and $T_5$, the initial potential before the noise reading operation is set to $E_L$. Therefore, the DC potentials of the signal components which are read out to the capacitors $C_1$ and $C_2$ and of the noise components differ. These potentials are unconditionally determined by the initial potentials of the line capacity of the vertical signal line end and of the temporary accumulation capacities of the capacitors $C_1$ and $C_2$. In this embodiment, the DC potential of the noise components which are read out to the capacitor $C_2$ is lower than the DC potential of the signal components which are read out to the capacitor $C_1$. Therefore, when the signal components and noise components are transferred from the capacitors $C_1$ and $C_2$ to the read signal lines $AL_1$ to $AL_4$, the clearing potentials of the signal lines $AL_2$ and $AL_4$ are set to a predetermined reference potential $E_r$ (negative potential in this embodiment) lower than the potentials of the signal lines $AL_1$ and $AL_3$ in order to equalize the potential between the base and emitter of the buffer amplifier $Qh_5$ in the signal components reading operation with that in the noise components reading operation.

Next, at time $t_{64}$, the transistors $Qh_4$ and $Qh_8$ of the reading circuit $YA_3$ are turned on by a scanning pulse $\phi_{A4}$ and the noise components accumulated in the capacitor $C_2$ are read out to the signal line $AL_2$ through the buffer amplifier $Qh_5$. Therefore, both the signal components and noise components accumulated in the capacitors $C_1$ and $C_2$ of the reading circuit $YM_3$ are supplied to an input terminal of the differential amplifier $OP_1$ of the output circuit 33. Thus, the differential signal which is obtained by eliminating the noise components from the signal components is held to the sample and hold circuit $SH_1$ by a sampling pulse $\phi_{SH1}$ and output as a signal SW.

On the other hand, the transistors $Qh_3$ and $Qh_7$ of the reading circuit $YM_4$ are simultaneously turned on by the scanning pulse $\phi_{A4}$ and the red signal components accumulated in the capacitor $C_1$ are read out to the read signal line $AL_3$ through the buffer amplifier $Qh_5$.

At time $t_{64}'$, the transistor $Qh_6$ is turned on by a pulse $\phi_{YR}$ and the capacitor $C_1$ and buffer amplifier $Qh_5$ are cleared in a manner similar to the case at time $t_{63}'$. On the other hand, in the clearing circuit 32, the transistors $Q_{C1}$ and $Q_{C4}$ are turned on by the pulse $\phi_{C1}$ and the signal lines $AL_1$ and $AL_4$ are cleared to the power source $E_r$ and the ground potential.

At time $t_{65}$, a scanning pulse $\phi_{A5}$ is generated and the signal components accumulated in the capacitor $C_1$ of a reading circuit $YM_5$ (not shown) are read out to the signal line $AL_1$ in a manner similar to the case at time $t_{63}$ mentioned above. At the same time, the noise components accumulated in the capacitor $C_2$ of the reading circuit $YM_4$ are read out to the signal line $AL_4$ and input to the differential amplifier $OP_2$ of the output circuit 33. Therefore, both the signal components and noise components accumulated in the capacitors $C_1$ and $C_2$ of the reading circuit $YM_4$ are supplied to the differential amplifier $OP_2$. Thus, the difference signal between them is held to the sample and hold circuit $SH_2$ by a sampling pulse $\phi_{sh2}$ and output as a signal SR.

In a manner similar to the above, the signals in the capacitors $C_1$ and $C_2$ of reading circuits $YM_6$, $YM_7$, ... are sequentially read out by scanning pulses $\phi_{A6}$, $\phi_{A7}$, ... from the horizontal scanning circuit 31 and output as the white component signal SW and red component signal SR.

On the other hand, in a manner similar to the case of the first horizontal scanning section 3, the signals accumulated in the capacitors $C_1$ and $C_2$ of reading circuits $YB_1$, $YB_2$, $YB_3$, ... are successively read out by scanning pulses $\phi_{B1}$, $\phi_{B2}$, $\phi_{B3}$, ... from the horizontal scanning circuit 41, so that the blue component signal SB and white component signal SW are output from the second horizontal scanning section 4.

Figure 19:
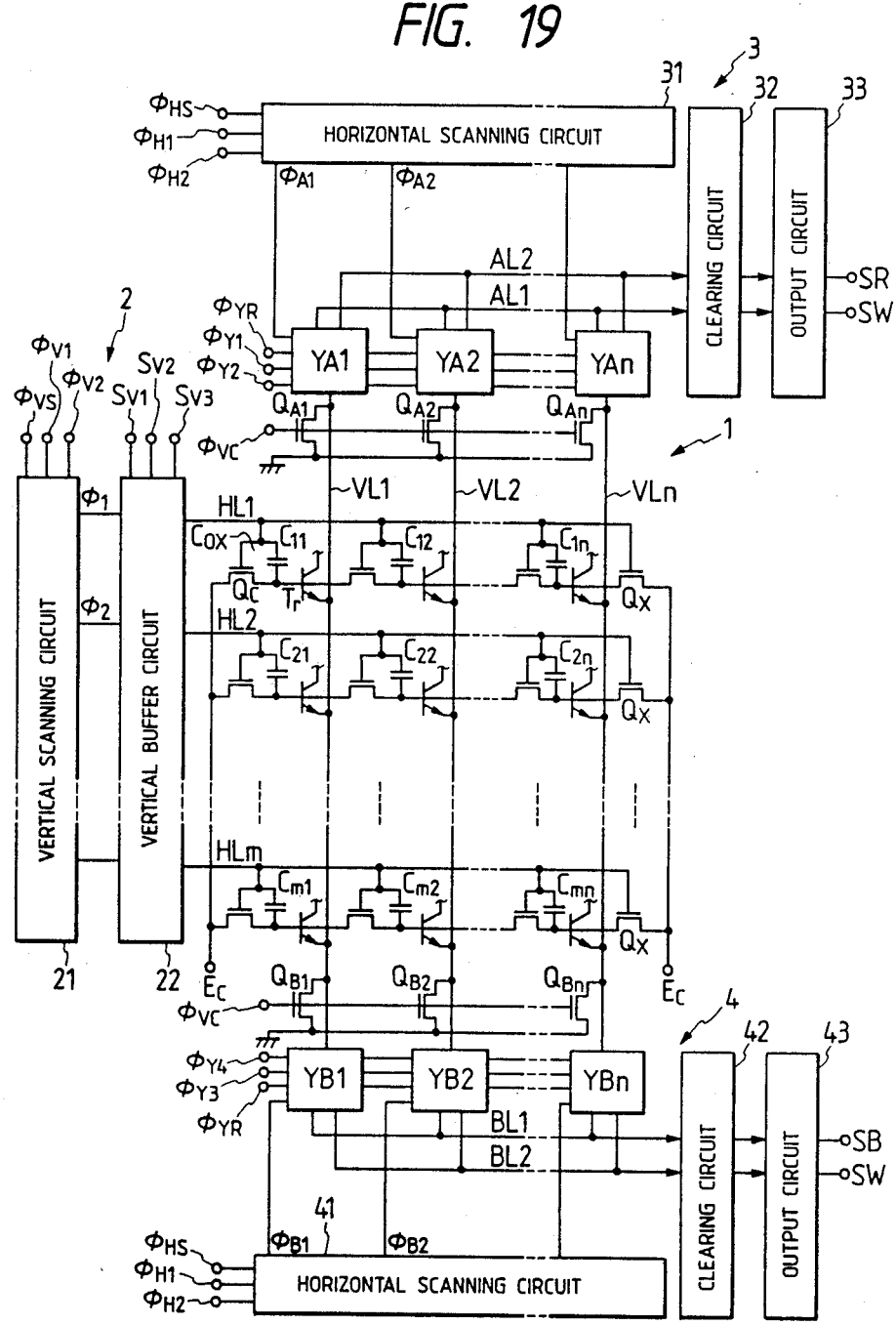
FIG. 19 is a schematic circuit diagram showing a third embodiment of a solid state image pickup apparatus according to the invention.

FIG. 19 is a schematic circuit diagram showing the third embodiment of a solid state image pickup apparatus according to the present invention.

The third embodiment has a construction similar to that of the first embodiment shown in FIG. 2A and only the signal components of the optical information accumulated in the photoelectric converting elements are read out and no noise component is read out. On the other hand, the reading circuits $YA_1$ to $YA_n$ and $YB_1$ to $YB_n$ are controlled by only the pulses $\phi_{A1}$ to $\phi_{An}$ of the horizontal scanning circuits 31 and 41. The reading circuits $YA_3$ and $YA_4$ of the first horizontal scanning section 3 and the clearing circuit 32 in this embodiment are constructed in a manner similar to those shown in FIG. 15 except that the pulse $\phi_A$ at the next stage is used in place of the pulse $\phi_B$ in FIG. 15.

Figure 20:
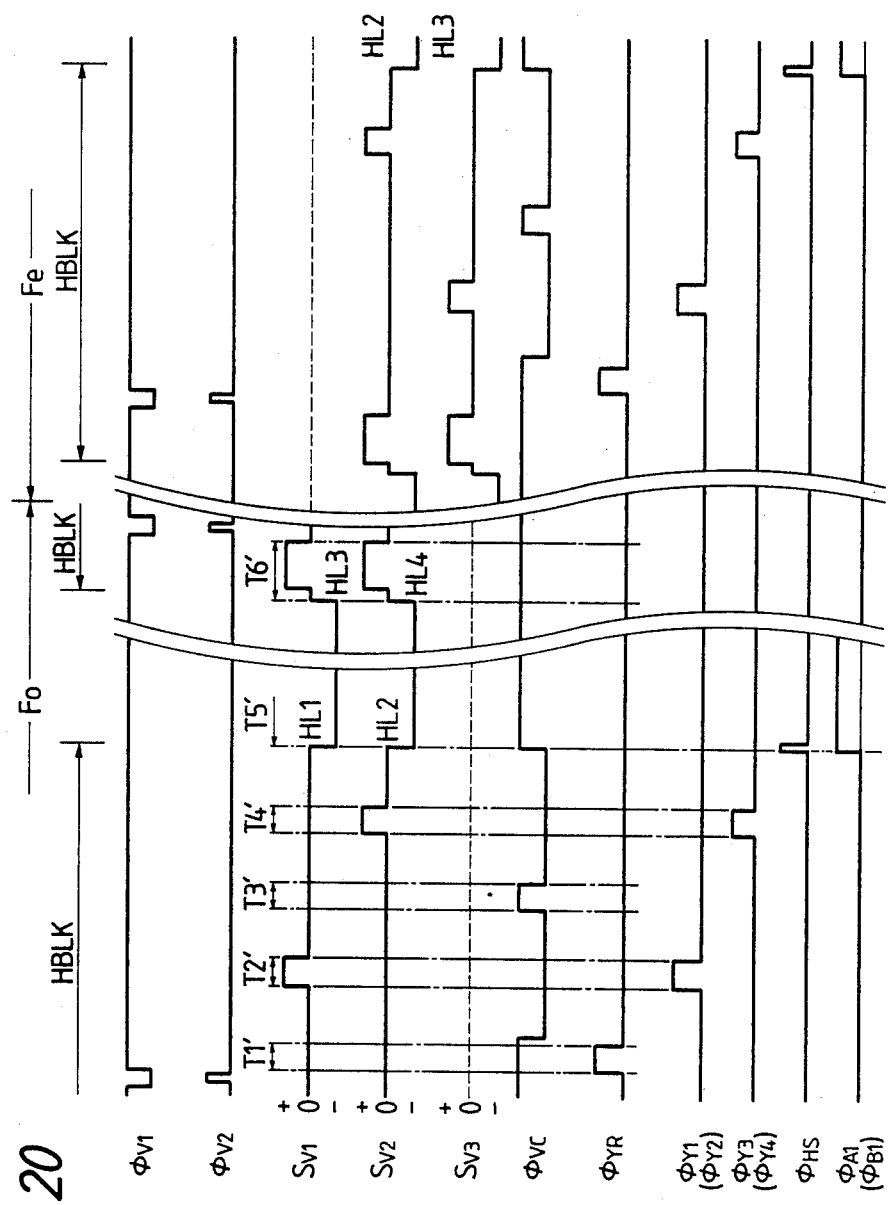
FIGS. 20 and 21 are timing charts for explaining the operation in FIG. 19.
Figure 21:
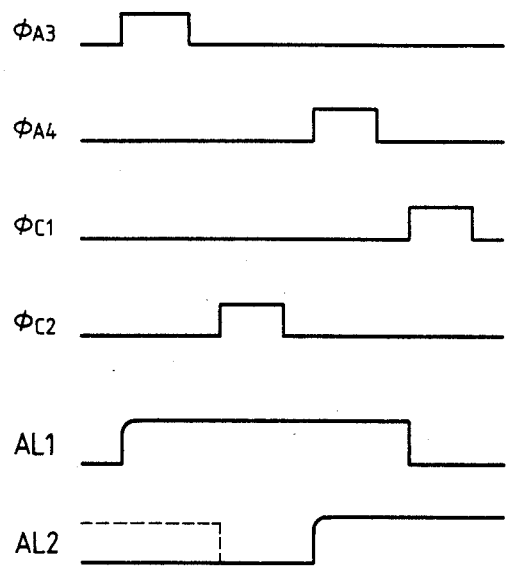

FIGS. 20 and 21 are timing charts for explaining the operation of FIG. 19. The operation will now be briefly explained since its fundamental operation is similar to FIGS. 6 and 18.

First, in period $T_1'$, the pulse $\phi_{YR}$ is set to "1", transistors $Q_3$ of the reading circuits $YA_1$ to $YA_n$ and $YB_1$ to $YB_n$ are turned on, thereby clearing the capacitor $C_1$ and the base region of the transistor $Q_2$.

In the next period $T_2'$, the drive signal $SV_1$ is set to a positive potential and the reading operations of the elements $C_{11}$ to $C_{1n}$ connected to the horizontal signal line $HL_1$ are performed. At the same time, the pulses $\phi_{Y1}$ and $\phi_{Y2}$ are set to "1", so that the transistors $Q_1$ of the reading circuits $YA_1$ to $YA_n$ are turned on and the optical information are accumulated in the capacitors $C_1$. In this case, the white signal components are accumulated in the reading circuits $YA_1$, $YA_3$, $YA_5$, ... of the odd-number columns and the red signal components are accumulated in the reading circuits $YA_2$, $YA_4$, $YA_6$, ... of the even-number columns.

Subsequently, in period $T_3'$, the pulse $\phi_{VC}$ is set to "1", the line capacities of the vertical signal lines $HL_1$ to $HL_n$ are cleared, and the elements $C_{21}$ to $C_{2n}$ are read out.

In the next period $T_4'$, the drive signal $SV_2$ is set to a positive potential and the reading operations of the elements $C_{21}$ to $C_{2n}$ are executed. At the same time, the pulses $\phi_{Y3}$ and $\phi_{Y4}$ are set to "1" and the optical information are accumulated into the capacitors $C_1$ of the reading circuits $YB_1$ to $YB_n$. In this case, the blue signal components are accumulated into the reading circuits $YB_1$, $YB_3$, $YB_5$, ... of the odd-number columns and the white signal components are accumulated into the reading circuits $YB_2$, $YB_4$, $YB_6$, ... of the even-number columns.

In horizontal effective period $T_5'$, the optical information accumulated in the reading circuits $YA_1$ to $YA_n$ and $YB_1$ to $YB_n$ are scanned and output to the outside and, at the same time, the elements $C_{11}$ to $C_{1n}$ and $C_{21}$ to $C_{2n}$ are reset, and the refreshing operation is executed for period $T_6'$.

The operation of the first horizontal scanning section in period $T_5'$ will now be described with reference to FIG. 21.

In the embodiment, since no noise component is read out, the white and red signal components are sequentially read out of the capacitors $C_1$ of the reading circuits $YA_3$, $YA_4$, ... to the signal lines $AL_1$ and $AL_2$ in accordance with the scanning pulses $\phi_{A3}$, $\phi_{A4}$, .... The pulses $\phi_{C1}$ and $\phi_{c2}$ are supplied such that the line capacities of the read signal lines $AL_1$ and $AL_2$ are cleared by the clearing circuit 32 during the reading operations.

Figure 22:
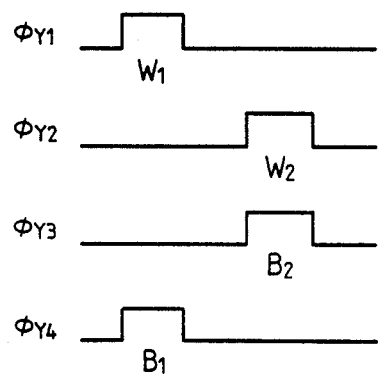
FIG. 22 is a timing chart for explaining another reading operation in FIG. 19.

Another reading operation in the embodiment of FIG. 19 will now be described with reference to a timing chart of FIG. 22.

In the foregoing reading operation, the color signal components accumulated in the elements $C_{11}$ to $C_{1n}$ of the first row are read out to the first horizontal scanning section and the color signal components accumulated in the elements $C_{21}$ to $C_{2n}$ of the second row are read out to the second horizontal scanning section. However, in this embodiment, in the reading operations of the elements $C_{11}$ to $C_{1n}$ of the first row, the pulses $\phi_{Y1}$ and $\phi_{Y4}$ are set to "1", the white signal components of the elements of the odd-number designated columns are read out to the first horizontal scanning section, and the red signal components of the elements of the even-number designated columns are read out to the second horizontal scanning section. In the reading operations of the elements $C_{21}$ to $C_{2n}$ of the second row, the pulses $\phi_{Y2}$ and $\phi_{Y3}$ are set to "1", the blue signal components of the elements of the odd-number designated columns are read out to the second horizontal scanning section, and the white signal components of the elements of the even-number designated columns are read out to the first horizontal scanning section.

In this manner, by reading out all of the white signal components constituting the luminance signal of the elements of the odd-number and even-number designated rows in the same direction, the signal waveforms or frequency characteristics of the white signal components are almost coincident. On the other hand, even in the signal processing circuit at the post stage, the wiring processes can be also similarly executed. Therefore, the luminance signal with less fixed pattern noises and having a good frequency characteristic can be derived.

As described above in detail, according to the solid state image pickup apparatus of the embodiment of this invention, since the optical information accumulated in the image pickup section are selectively read out from both directions on the vertical signal line, decrease in signal level can be eliminated and the frequency of the scanning pulses can be increased. In addition, the application of this invention to various kinds of systems such as black and white cameras or various kinds of color cameras can be enlarged.

Further, since the signals forming the luminance signal can be read out from the same signal line or adjacent signal lines, a signal having good picture quality can be obtained.

What is claimed is:

1. A solid state image pickup apparatus comprising a plurality of photoelectric converting elements for accumulating optical information to be read out to the outside by multi-phase scanning pulses, wherein said multi-phase scanning pulses scan temporary accumulation capacitors to read out to the outside said optical information accumulated therein.

2. An apparatus according to claim 1, wherein said multi-phase scanning pulses have portions which overlap each other.

3. An apparatus according to claim 1, wherein said plurality of photoelectric converting elements are arranged like a matrix.

4. An apparatus according to claim 3, wherein outputs of said plurality of photoelectric converting elements of each column can be connected to a common signal line.

5. An apparatus according to claim 4, further having a capacitor for every said signal line.

6. A solid state image pickup apparatus comprising a plurality of photoelectric converting elements arranged in a matrix having a first portion and a second portion, on a plurality of horizontal and vertical signal lines, wherein respective optical information accumulated in the first and second portions of said photoelectric converting elements is read out to each of said vertical signal lines and wherein the information in the first portion is selectively output from one end of said vertical signal lines and the information in the second portion is selectively output from the other end of said vertical signal line.

7. A solid state image pickup apparatus according to claim 6, wherein the first portion and the second portion are disposed next to each other.

8. A solid state image pickup apparatus according to claim 7, wherein the first portion and the second portion are interlaced with each other.

* * * * *

UNITED STATES PATENT AND TRADEMARK OFFICE
CERTIFICATE OF CORRECTION

PATENT NO. : 4,959,723

DATED : September 25, 1990

INVENTOR(S) : SEIJI HASHIMOTO

It is certified that error appears in the above-identified patent and that said Letters Patent is hereby corrected as shown below:

COLUMN 1

Line 36, "read 105" should read --read signal line 105--.
Line 37, "signal line" should be deleted.
Line 64, "divided read signal lines." should read
--individual divided read signal lines.--.

Signed and Sealed this

Fourteenth Day of July, 1992

Attest:

DOUGLAS B. COMER

Attesting Officer    Acting Commissioner of Patents and Trademarks